J. G. UTZ.
TRANSMISSION MECHANISM.
APPLICATION FILED NOV. 22, 1910.

1,079,961.

Patented Dec. 2, 1913.

UNITED STATES PATENT OFFICE.

JOHN G. UTZ, OF DETROIT, MICHIGAN.

TRANSMISSION MECHANISM.

1,079,961.  Specification of Letters Patent.  Patented Dec. 2, 1913.

Application filed November 22, 1910. Serial No. 593,654.

*To all whom it may concern:*

Be it known that I, JOHN G. UTZ, a citizen of the United States of America, residing at Detroit, in the county of Wayne and State of Michigan, have invented certain new and useful Improvements in Transmission Mechanism, of which the following is a specification, reference being had therein to the accompanying drawings.

This invention relates to variable speed mechanism for automobiles or the like and more particularly to an arrangement thereof whereby the number of bearings are reduced and whereby shifting of the mechanism from one point to another is accomplished without liability of injury to the running parts.

The invention consists in the matters hereinafter set forth, and more particularly pointed out in the appended claims.

Figure 1:
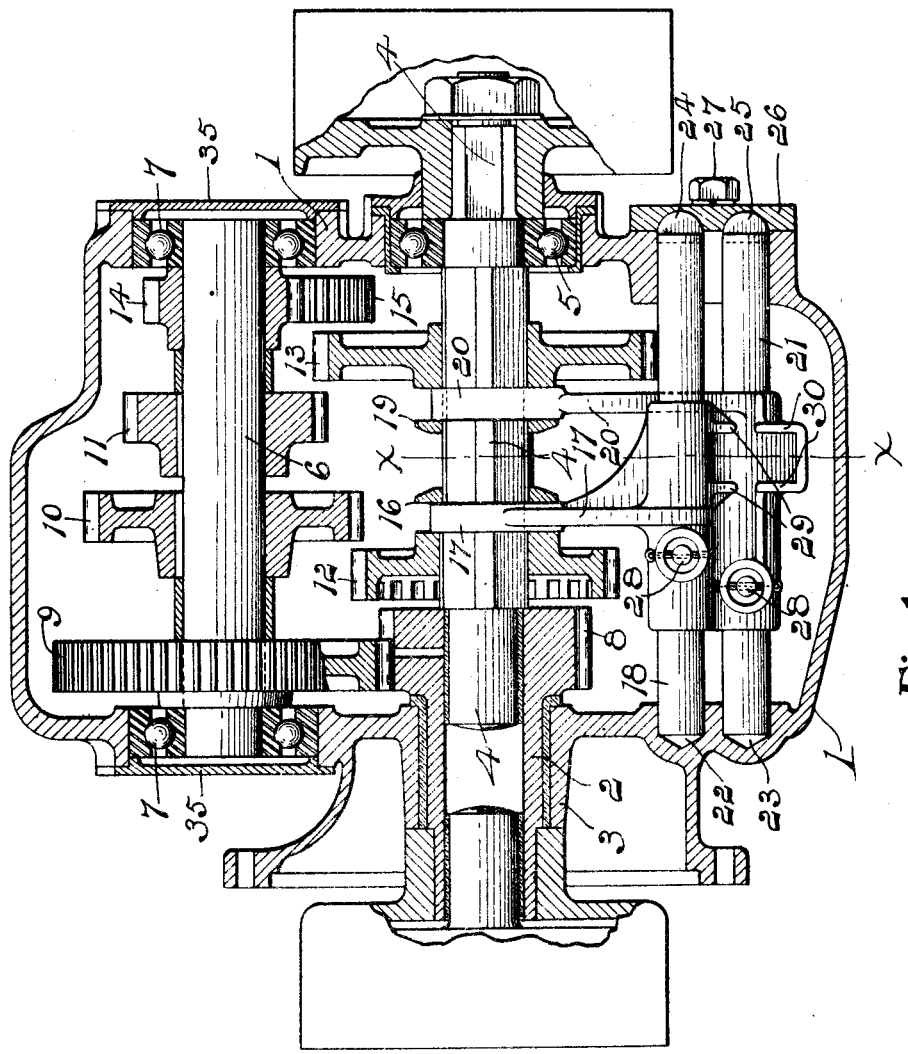
Figure 2:
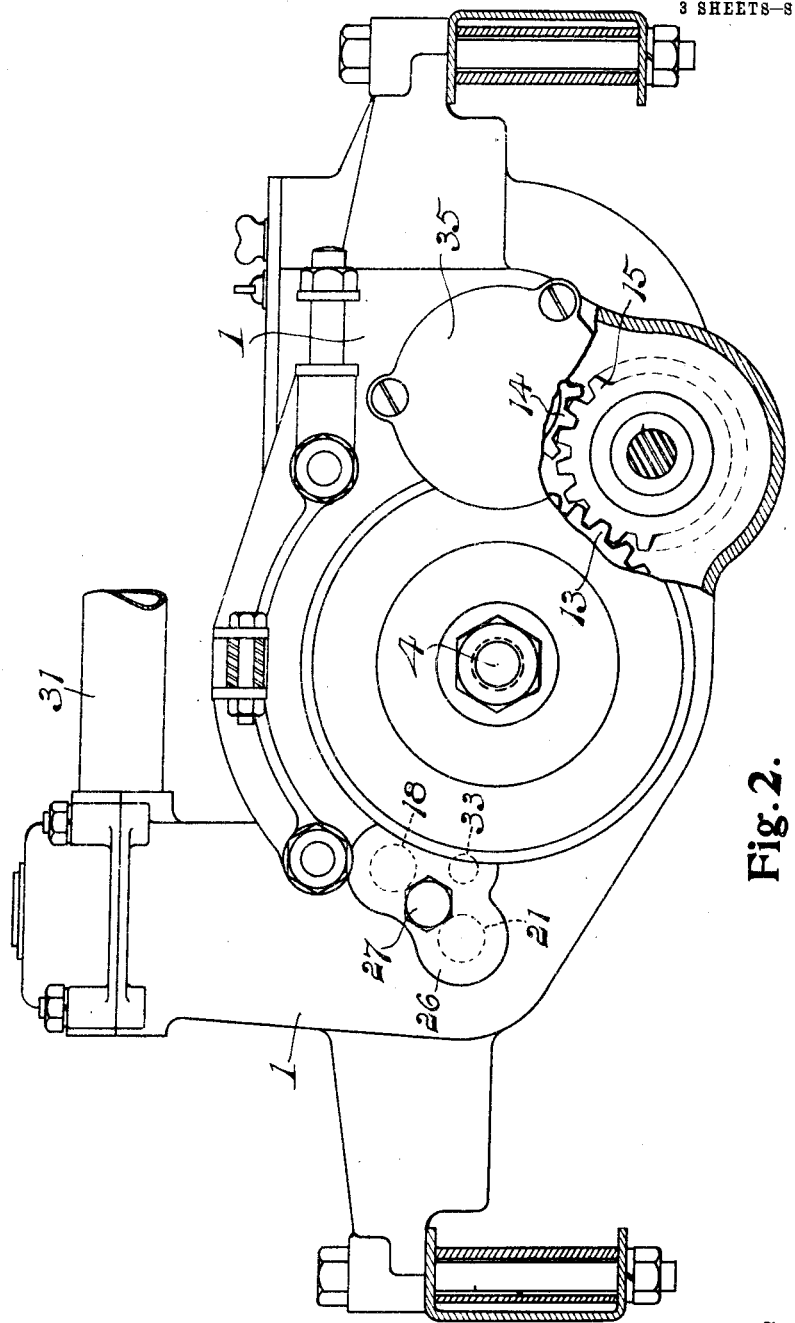
Figure 4:
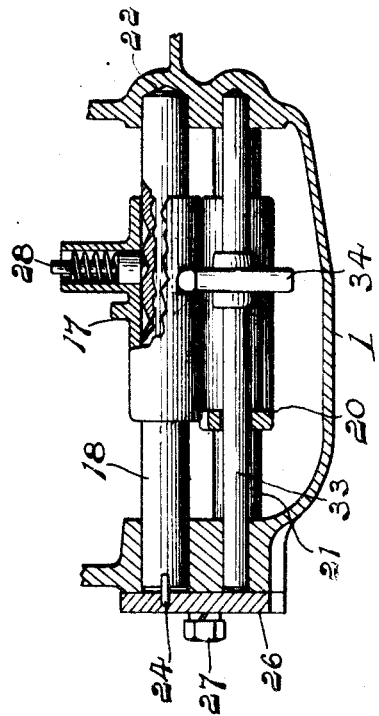
Figure 3:
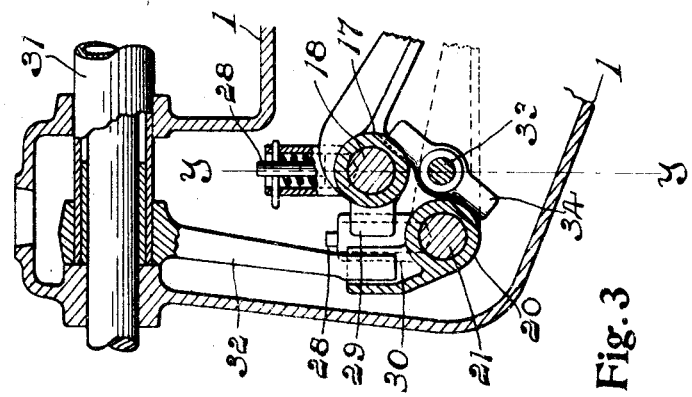

Referring to the drawings, Figure 1 is a view in longitudinal section of a mechanism embodying features of the invention; Fig. 2 is an end view thereof partially broken away and in section; Fig. 3 is a view in detail of an interlocking device taken on or about line $x$—$x$ of Fig. 1; and Fig. 4 is a view in detail in section taken on or about line $y$—$y$ of Fig. 1.

In the drawings a casing 1 of suitable design has a hollow shaft 2 journaled in a bearing 3 at one end thereof, and a second or follower shaft 4 in axial alinement with the shaft 2 with its inner end stepped in the latter and its outer end journaled in an anti-friction bearing 5 in the casing. An intermediate shaft 6 is journaled at its ends in suitable bearings 7 in the casing wall in parallel relation to the shafts 2 and 4. Each anti-friction bearing is held in place by retaining plates 35 which are readily removed for inspection of the bearing. A pinion 8 secured to or integrally formed on the inner end of the shaft 2, is in permanent mesh with a gear 9 likewise keyed or secured to the intermediate shaft 6. An intermediate gear 10 and low speed gear 11 are likewise keyed or otherwise secured in spaced relation on the shaft 6. The former is adapted to mesh with a slide gear 12 non-rotatable and reciprocable on the shaft 4 and the other gear 11 is likewise adapted to mesh with a slide gear 13 non-rotatable and reciprocable on the shaft 4. A reverse gear 14 secured on the shaft 6 is in mesh with a pinion 15 journaled on a stud in the end of the casing 6 and arranged to mesh with the slide gear 13 when the latter is moved toward the adjacent end of the casing.

A peripherally grooved hub 16 on the gear 12 is engaged by a slide yoke 17 reciprocable on a guide 18 secured in the casing parallel to the shafts. The slow speed and reverse gear 13 has a peripherally grooved hub 19 engaged by a reverse slide yoke 20 reciprocable on a second guide rod 21 adjacent and parallel to the guide 18. The guide rods are preferably secured in the casing in apertures in the end wall thereof alined with sockets 22 and 23 in the opposite wall and are kept from rotating by end keys 24 and 25 engaging slots in which they are held by a keeper plate 26 secured against the casing by a stud 27. Spring plungers 28 in each yoke engage depressions or spots in the guide rods which indicate to the operator when the gears are in engagement.

A pair of ears or lugs 29 on the yoke 17 are adapted to register with an oppositely disposed pair of lugs 30 on the reverse yoke when both yokes and their attached gears are in released position. A rock shaft 31 journaled in the casing transversely to the guides has a finger 32 extending between the shifting yoke hubs and arranged when moved in one direction to engage the intermediate yoke and when in the other direction to interlock with the reverse or slow speed yoke. This combined rocking and sliding movement is obtained in the usual manner by a lever working in an H-quadrant not shown or claimed herein as it is a standard construction in automobile control systems. A rod or stud 33 fixed in the casing in parallel relation to the guides 21 and 18 carries a keeper 34 with oppositely extending arms one of which is adapted to be raised by the adjacent yoke when the latter is shifted so that the companion arm drops into a notch in the other yoke and holds it against movement. This prevents accidental displacement of the yoke not in use and avoids accidental stripping of the gears.

The main and follower shafts are directly coupled to rotate together by means of the slide gear 12 which has a recessed hub or face adapted to non-rotatably interlock with the adjacent pinion 8 of the main shaft when moved against it by its slide yoke. By this arrangement, the necessary speed changes are obtained with the use of very few running parts, the main bearings being readily accessible for taking up or replacement and the shifting device being simple and effective.

Obviously, changes in the details of construction may be made without departing from the spirit of the invention and I do not care to limit myself to any particular form or arrangement of parts.

What I claim as my invention is:—

1. Transmission mechanism comprising a casing, a pair of oppositely disposed bearings therein, a main shaft journaled in one bearing, a follower shaft journaled in the other bearing and in the main shaft, a pair of removably secured anti-friction bearings in the casing, an intermediate shaft journaled therein and geared to the main shaft, change speed gears on the intermediate shaft, slide gears on the follower shaft adapted to selectively engage the intermediate shaft gears, one of the slide gears being also adapted to non-rotatably engage the main shaft gear, guide rods non-rotatably secured in the casing parallel to the shafts, a yoke non-rotatably and longitudinally reciprocable on each rod engaging a slide gear, a rock-shaft journaled in the casing transversely to the guide rods, a finger on the rock shaft adapted to detachably interlock with either one of the slide yokes, and means for locking the disengaged yoke from movement.

2. Transmission mechanism comprising a casing, a pair of oppositely disposed bearings therein, a main shaft journaled in one bearing, a follower shaft journaled in the other bearing and in the main shaft, a pair of removably secured anti-friction bearings in the casing, an intermediate shaft journaled therein and geared to the main shaft, change speed gears on the intermediate shaft, slide gears on the follower shaft adapted to selectively engage the intermediate shaft gears, one of the slide gears being also adapted to non-rotatably engage the main shaft, guide rods in the casing parallel to the shafts, a keeper plate detachably secured on the casing adjacent the rods, keys secured by the plate that engage transverse key-seats in the end faces of the rods, a yoke non-rotatable and longitudinally reciprocable on each rod engaging a slide gear, a rock-shaft journaled in the casing transversely to the guide rods, a finger on the rock shaft adapted to detachably interlock with either one of the slide yokes, and means for locking the disengaged yoke from movement.

3. Transmission mechanism comprising a casing, a main shaft journaled therein, a follower shaft journaled in the casing and end portion of the main shaft, means for transmitting motion at various speeds from one shaft to the other, comprising slide gears on the follower shaft, a pair of guide rods parallel to the shafts, a keeper plate on the casing, keys non-rotatably engaging the plate and adjacent extremities of the rods, a yoke reciprocable on each rod engaging a slide gear, said yokes being provided with oppositely disposed pairs of lugs on their adjacent sides, a rock shaft journaled in the casing transversely to the guide rods, a finger on the rock-shaft adapted to interlock with one pair of lugs when moved in one direction and the other pair when moved in the opposite direction, a member oscillating in the casing adapted to be moved by one yoke into interlocking engagement with the other yoke to hold the latter when the former is shifted.

4. Transmission mechanism comprising a casing, a main shaft journaled therein, a follower shaft journaled in the casing in axial alinement with the main shaft, means for transmitting motion at various speeds from one shaft to the other, comprising slide gears on the follower shaft, guide rods each secured at one end in a socket in the casing wall and at the other in an aperture in the casing, a keeper plate detachably secured on the casing over the ends of the rods, keys in the plate engaging transverse key-ways in the adjacent ends of the rods, a yoke non-rotatably reciprocable on each rod in engagement with a slide gear, each yoke being provided with a pair of lugs in spaced relation adapted to register with the corresponding pair on the adjacent yoke when the yokes are in release position, a rock shaft journaled in the casing transversely to the guide rods, a finger on the rock-shaft adapted to interlock with one pair of lugs when moved in one direction and with the other pair when moved in the opposite direction, and an oscillatory member in the casing adapted to be moved by one yoke into interlocking engagement with the other yoke to retain the latter in release position when the former is shifted.

5. Transmission mechanism comprising a casing, a main shaft journaled in the casing, a follower shaft journaled in the casing in axial alinement with the main shaft, an intermediate shaft journaled in the casing and geared to the main shaft, change speed gears on the intermediate shaft, slide gears on the follower shaft adapted to selectively engage the intermediate shaft gears, a pair of guide rods parallel to the shafts, a keeper plate on the casing, keys non-rotatably engaging the rods, a yoke reciprocable on each rod engaging a slide gear, and having oppositely disposed pairs of lugs on their adjacent sides, a rock shaft journaled in the casing transversely to the guide rods, a finger on the rock-shaft adapted to interlock with one pair of lugs when moved in one direction and the other pair when moved in the opposite direction, and a member oscillating in the casing adapted to be moved by one yoke into interlocking engagement with the other yoke to retain the latter in release position when the former is shifted.

6. In a transmission mechanism, the combination of a casing, a main shaft journaled in said casing, a follower shaft journaled in the casing in axial alinement with the main shaft, means for transmitting motion from one shaft to the other at different speeds comprising slide gears on the follower shaft, guide rods in the casing, a yoke on each rod independently movable longitudinally of said rods and engaging the slide gears to shift the same, a pivoted finger adapted to interlock with either of said yokes, means for operating said finger, and means for holding the disengaged yoke against movement.

In testimony whereof I affix my signature in presence of two witnesses.

JOHN G. UTZ.

Witnesses:
 OTTO F. BARTHEL,
 ANNA M. DORR.